(12) United States Patent
Morris

(10) Patent No.: US 10,584,624 B2
(45) Date of Patent: Mar. 10, 2020

(54) METHOD AND ARRANGEMENT FOR CORRECTING FOR ERROR OF PARTICULATE MATTER SENSORS

(71) Applicants: Heath Morris, Hagerstown, MD (US); VOLVO TRUCK CORPORATION, Göteborg (SE)

(72) Inventor: Heath Morris, Hagerstown, MD (US)

(73) Assignee: Volvo Truck Corporation, Göteborg (SE)

(*) Notice: Subject to any disclaimer, the term of this patent is extended or adjusted under 35 U.S.C. 154(b) by 74 days.

(21) Appl. No.: 15/769,422

(22) PCT Filed: Nov. 18, 2015

(86) PCT No.: PCT/US2015/061216
§ 371 (c)(1),
(2) Date: Apr. 19, 2018

(87) PCT Pub. No.: WO2017/086942
PCT Pub. Date: May 26, 2017

(65) Prior Publication Data
US 2018/0306089 A1    Oct. 25, 2018

(51) Int. Cl.
*F01N 11/00* (2006.01)
*F02D 41/24* (2006.01)
(Continued)

(52) U.S. Cl.
CPC ........... *F01N 11/002* (2013.01); *F01N 3/021* (2013.01); *F01N 9/005* (2013.01); *F01N 11/00* (2013.01);
(Continued)

(58) Field of Classification Search
CPC ............... F01N 11/002; F01N 2560/05; F01N 2900/1606; F01N 2900/08; F01N 2900/0416; F02D 41/029
See application file for complete search history.

(56) References Cited

U.S. PATENT DOCUMENTS 6,725,652 B2    4/2004    Sakaguchi
7,568,376 B2    8/2009    Strohmaier et al.
(Continued)

FOREIGN PATENT DOCUMENTS

DE    102005016132 A1    10/2006
DE    102007022690 A1    11/2008
(Continued)

OTHER PUBLICATIONS

European Official Action (dated Jul. 22, 2019) for corresponding European App. 15908935.8.
(Continued)

*Primary Examiner* — Patrick D Maines
(74) *Attorney, Agent, or Firm* — WRB-IP LLP

(57) ABSTRACT

A method for correcting for aging in particulate matter sensors for a diesel engine includes calculating calculated particulate matter values for a modeled diesel engine exhaust system over a period of time, measuring measured test particulate matter values with a test particulate matter sensor over the period of time in a test diesel engine exhaust system, determining differences between the calculated particulate matter values and the measured test particulate matter values from the test particulate matter sensor over the period of time, and correcting measured particulate matter values in at least one other particulate matter sensor over a same period of time based on the determined differences to obtain a corrected particulate matter value. A particulate
(Continued)

matter sensor arrangement and a vehicle including a particulate matter sensor arrangement are also provided.

20 Claims, 3 Drawing Sheets

(51) Int. Cl.
*F01N 9/00* (2006.01)
*G01M 15/10* (2006.01)
*F02D 41/14* (2006.01)
*F01N 3/021* (2006.01)
*F02D 41/02* (2006.01)

(52) U.S. Cl.
CPC ....... *F02D 41/029* (2013.01); *F02D 41/1466* (2013.01); *F02D 41/2474* (2013.01); *G01M 15/10* (2013.01); *F01N 2560/05* (2013.01); *F01N 2560/14* (2013.01); *F01N 2590/08* (2013.01); *F01N 2900/0402* (2013.01); *F01N 2900/0416* (2013.01); *F01N 2900/0418* (2013.01); *F01N 2900/0422* (2013.01); *F01N 2900/08* (2013.01); *F01N 2900/1402* (2013.01); *F01N 2900/1606* (2013.01); *Y02T 10/47* (2013.01)

(56) References Cited

U.S. PATENT DOCUMENTS

| | | |
|---|---|---|
| 8,845,798 B2 | 9/2014 | Nishijima |
| 2006/0179826 A1* | 8/2006 | Kuboshima ............. F01N 9/002 60/297 |
| 2007/0033926 A1 | 2/2007 | Berger et al. |
| 2008/0000286 A1* | 1/2008 | Strohmaier ......... F02D 41/1466 73/23.21 |
| 2008/0097678 A1* | 4/2008 | Huelser ................... F01N 3/023 701/101 |
| 2009/0013758 A1* | 1/2009 | Baumann ................ F01N 11/00 73/23.33 |
| 2009/0120161 A1 | 5/2009 | Ishiguro et al. |
| 2010/0011750 A1* | 1/2010 | Onodera ............ B01D 46/0061 60/287 |
| 2010/0049462 A1* | 2/2010 | Krafthefer ............. F01N 3/023 702/104 |
| 2012/0291632 A1 | 11/2012 | Nishijima |
| 2015/0120229 A1* | 4/2015 | Sugiyama .......... G01N 15/0606 702/85 |

FOREIGN PATENT DOCUMENTS

| | | |
|---|---|---|
| DE | 102013104693 A1 | 11/2013 |
| DE | 102014208875 A1 * | 11/2015 |
| EP | 2031370 A1 | 8/2007 |
| EP | 2578827 A1 * | 4/2013 |
| EP | 2578827 A1 | 4/2013 |
| FR | 3018544 A1 | 9/2015 |

OTHER PUBLICATIONS

International Search Report (dated Jan. 28, 2016) for corresponding International App. PCT/US2015/061216.

* cited by examiner

METHOD AND ARRANGEMENT FOR CORRECTING FOR ERROR OF PARTICULATE MATTER SENSORS

BACKGROUND AND SUMMARY

The present invention relates generally to particulate matter sensors for diesel engine exhaust systems and, more particularly, to arrangements for correcting for errors in such sensors.

Diesel engine manufacturers typically utilize a particulate matter sensor to measure particulates exiting the engine exhaust aftertreatment system. These sensors are susceptible to contaminates poisoning and causing measurement error. This kind of error may be referred to as aging or accumulated error. There is currently no method to correct for this error. As these contaminates accumulate, it becomes necessary to replace the sensor.

It is desirable to provide an arrangement and method that allows for the correction of this error and permits the useful life of these sensors to be extended.

In accordance with a first aspect of the present invention, a method for correcting for aging in particulate matter sensors for a diesel engine comprises calculating calculated particulate matter values for a modeled diesel engine exhaust system over a period of time, measuring measured test particulate matter values with a test particulate matter sensor over the period of time in a test diesel engine exhaust system, determining differences between the calculated particulate matter values and the measured test particulate matter values from the test particulate matter sensor over the period of time, and correcting measured particulate matter values in at least one other particulate matter sensor over a same period of time based on the determined differences to obtain a corrected particulate matter value.

In accordance with another aspect of the present invention, a particulate matter sensor arrangement comprises a particulate matter sensor configured to measure particulate matter values and produce measured particulate matter values, and a controller programmed to provide corrected measured particulate matter values for the measured particulate matter values based on determined differences between calculated particulate matter values calculated for a modeled diesel engine exhaust system over a period of time and measured test particulate matter values measured with a test particulate matter sensor over the period of time in a test diesel engine exhaust system.

In accordance with yet another aspect of the present invention, a vehicle comprises a diesel engine, an exhaust system downstream of the diesel engine, and a particulate matter sensor arrangement. The particulate matter sensor arrangement comprises a particulate matter sensor configured to measure particulate matter values in the exhaust system, and a controller programmed to provide corrected measured particulate matter values based on determined differences between calculated particulate matter values calculated for a modeled diesel engine exhaust system over a period of time and measured test particulate matter values measured with a test particulate matter sensor over the period of time in a test diesel engine exhaust system.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
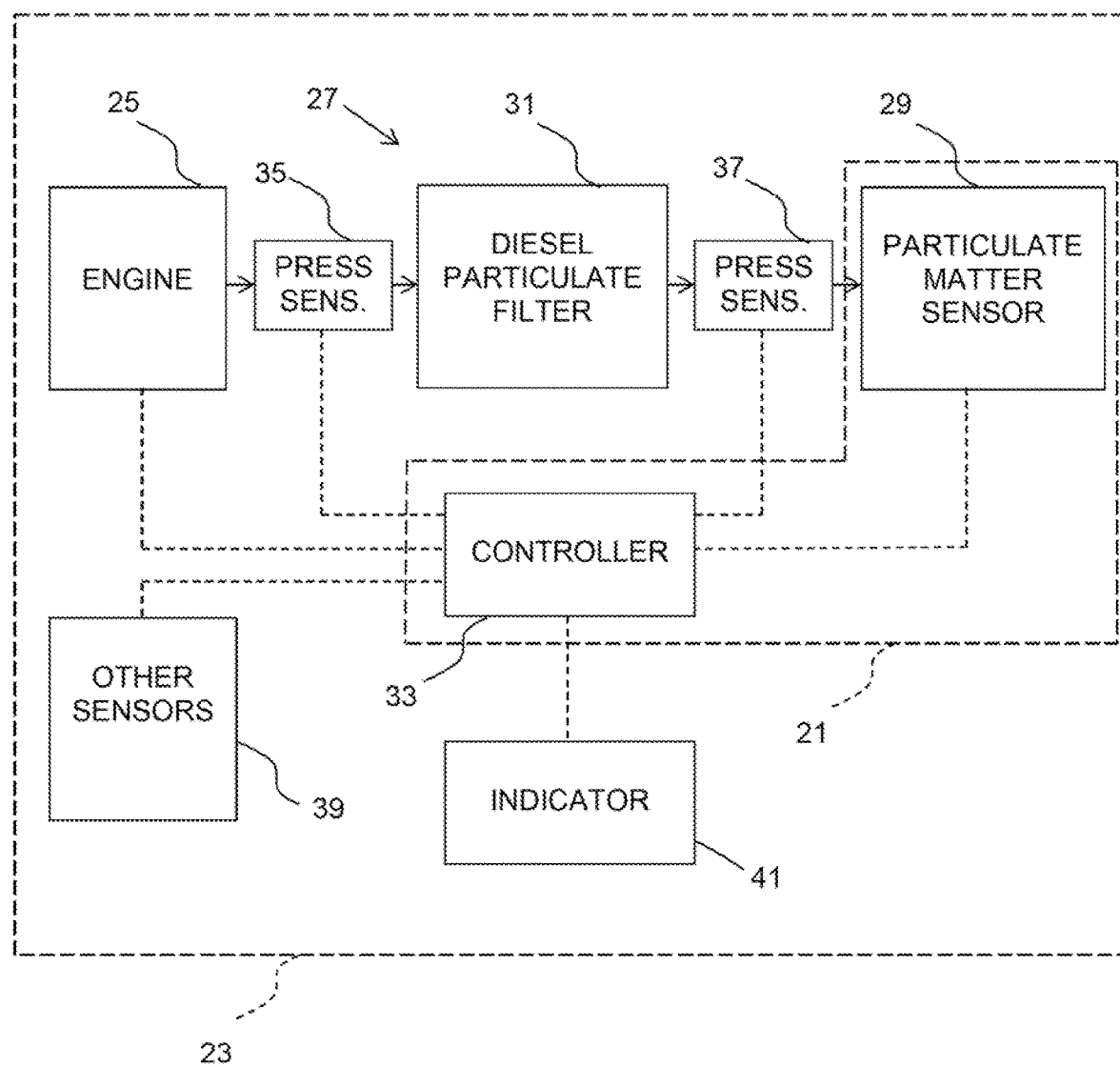
FIG. 1 is a schematic view of a particulate matter sensor arrangement according to an aspect of the present invention.

A particulate matter sensor arrangement 21 according to an aspect of the present invention is shown in combination with a vehicle 23 having a diesel engine 25 and an exhaust system 27 downstream of the engine in FIG. 1. A particulate matter sensor 29 of the particulate matter sensor arrangement 21 is disposed in the exhaust system 27. Typically, the particulate matter sensor 29 is disposed downstream of a diesel particulate filter (DPF) 31 in the exhaust system, however, particulate matter sensors may be disposed upstream of the DPF. Other components typically found in the exhaust system for a diesel engine, such as a diesel oxidation catalyst, a selective catalytic reduction catalyst, an EGR system, a turbocharger turbine may be included but are not illustrated.

The particulate matter sensor arrangement 21 also includes a controller 33 programmed to provide corrected measured particulate matter values for measured particulate matter values based on determined differences between calculated particulate matter values calculated for a modeled diesel engine exhaust system over a period of time and measured test particulate matter values measured with a test particulate matter sensor over the period of time in a test diesel engine exhaust system. The calculated particulate matter values, the measured test particulate matter values, and the corrected measured particulate matter values may all be based upon particulate matter that would be generated by vehicles such as a truck with a diesel engine.

The calculated particulate matter values are typically calculated using at least one of a chemical and a pressure model for soot loading of the DPF, typically in combination with soot levels calculated based on the operating conditions of the engine and the environmental conditions. For example, in a simple embodiment, the amount of soot that is calculated to be produced by the engine during particular operating and environmental conditions minus the amount of soot that should be captured by the particular DPF, as calculated by known chemical and/or pressure models for filtration efficiency of the DPF, can yield the calculated particulate matter value at a particular time. Typically, the calculated particulate matter values are calculated by modeling engine-out soot and filtration efficiency of the DPF under a plurality of diesel engine operating conditions, e.g., different loads, different speeds, and under a plurality of environmental conditions, e.g., different temperatures, different atmospheric pressures. Likewise, the measured particulate matter values are measured under a plurality of diesel engine operating conditions and under a plurality of environmental conditions. Ordinarily, the test diesel engine exhaust system is operated under the same conditions as the modeled diesel engine exhaust system so that the calculated particulate matter values calculated based on certain operating and environmental conditions can be compared with measured test particulate matter values measured under the same operating and environmental conditions over the period of time. In this way, a graph of calculated particulate matter values and a graph of measured test particulate matter values can be prepared to facilitate comparison of values over the period of time.

Pressure sensors 35 and 37 can be provided upstream and downstream of the DPF 31 to measure pressure drop across the DPF. The measured pressure drop can be processed by the controller 33 to estimate the soot loading of the DPF 31. Other sensors 39 can be provided, as well, and can provide signals to the controller 33 that are relevant to the amount of particulate matter that should be detected by the particulate matter sensor 29, including the amount of soot that the engine 25 is expected to produce under given operating and environmental conditions, such as signals from environmental sensors for temperature and altitude, and signals for engine operating conditions, such as engine load and engine speed. Other sensors, such as exhaust oxygen sensors, NOx sensors, and engine intake air humidity sensors, can also help estimate engine soot out and, thus, DPF soot load.

Figure 3:
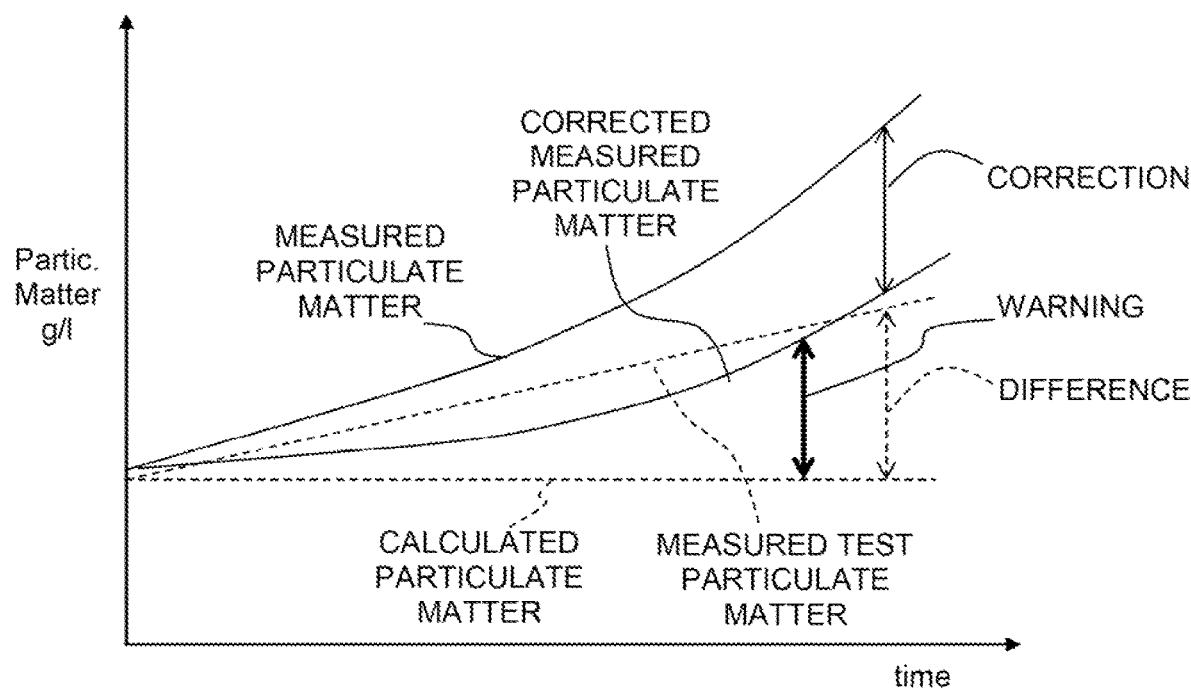
FIG. 3 is a graph showing the correction of a particulate matter sensor according to an aspect of the present invention in which a first warning is provided.

In the event of the detection of a condition that is indicative of a possible failure of the particulate matter sensor, the controller 33 can send a signal to an indicator 41 such as a screen visible to an operator, a warning light, or an alarm. For example, if a difference between a corrected measured particulate matter value and the calculated particulate matter value is equal to or greater than a predetermined amount, such as is seen in FIG. 3, the indicator 41 can provide an appropriate warning. As a further example illustrated in FIG. 4, if, over a predetermined period of time, a difference between a corrected measured particulate matter value and a calculated particulate matter increases to or beyond a predetermined amount, even though the difference is smaller than the predetermined difference shown in FIG. 3.

Figure 2:
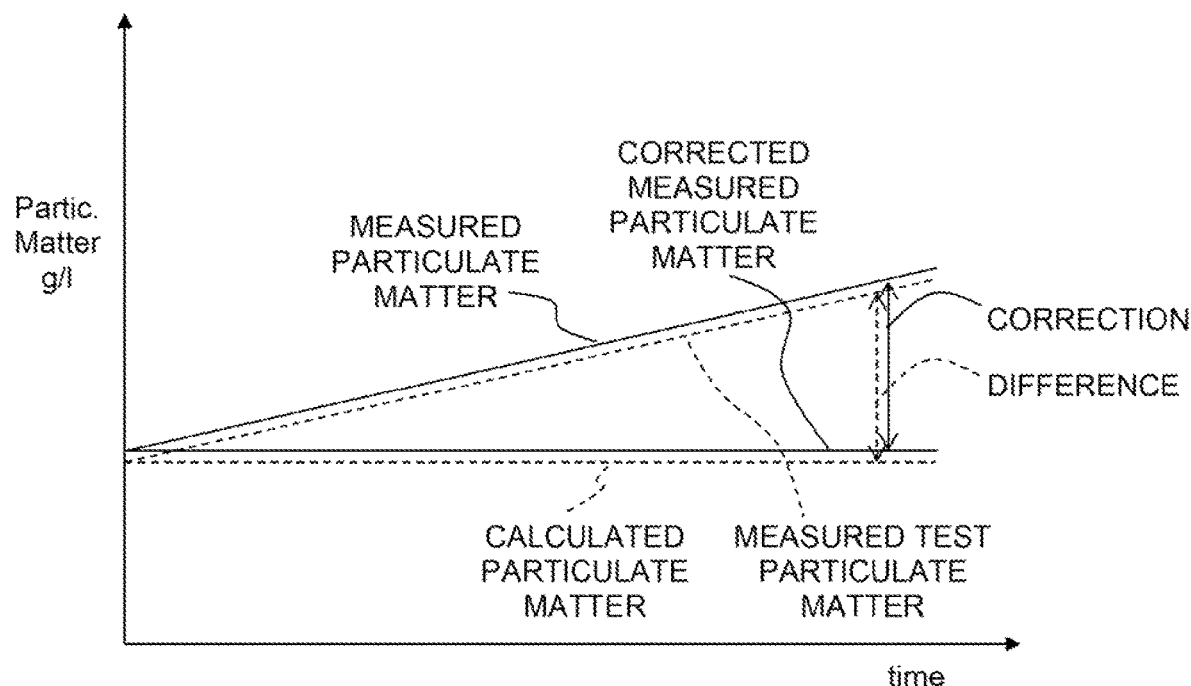
FIG. 2 is a graph showing the correction of a particulate matter sensor according to an aspect of the present invention.
Figure 4:
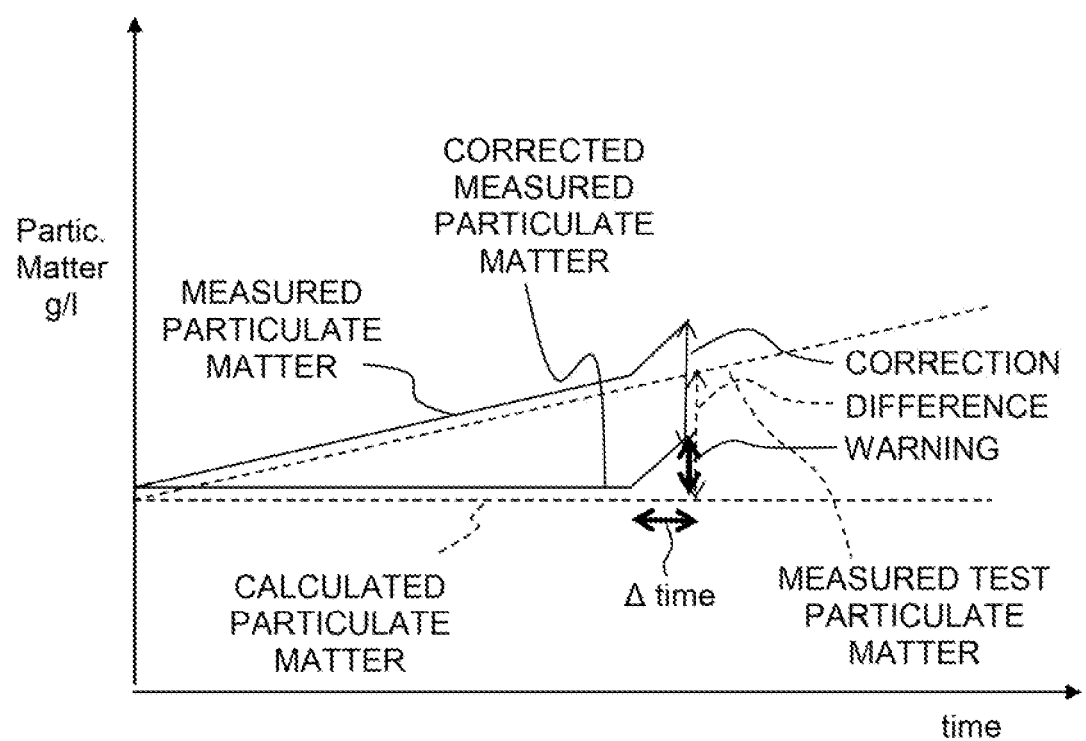
FIG. 4 is a graph showing the correction of a particulate matter sensor according to an aspect of the present invention in which a second warning is provided.

A method for correcting for aging in the particulate matter sensor 29 for the diesel engine 25 comprises calculating calculated particulate matter values for a modeled diesel engine exhaust system over a period of time. This is illustrated on the graphs shown in FIGS. 2-4. It will be appreciated that the straight line shown in FIGS. 2-4 is merely illustrative, and a variety of models can be developed so that calculated particulate matter values can be calculated for a variety of environmental and operational conditions. It will be appreciated, for example, that calculated particulate matter values may rise and fall as filters become increasingly loaded with soot, are regenerated, and become loaded again, and as engine loads and speeds increase or decrease. The model may have an arrangement identical to that shown in FIG. 1.

According to the method, measured test particulate matter values are measured with a test particulate matter sensor over the period of time in a test diesel engine exhaust system. Illustrative measured test particulate matter values are shown in FIGS. 2-4. The test diesel exhaust system may have an arrangement identical to that shown in FIG. 1. The test diesel engine exhaust system can be operated under the same conditions as the modeled diesel engine exhaust system so that sufficient data points are obtained for the model and the test system to compare results over a range of variable conditions.

Typically, the longer the test particulate matter sensor is used, the more that it will become poisoned and measurement error will occur, resulting in a difference between the measured test particulate matter values and the calculated particulate matter values. FIGS. 2-4 show the measured test particulate matter values becoming increasingly larger than the calculated particulate matter values, however, it is possible that for certain types of sensors, the measured test particulate matter values may become increasingly smaller than the calculated particulate matter values. FIGS. 2-4 show the measured test particulate matter values differing from the calculated particulate matter values at a steady rate, i.e., increasing in a straight line fashion at a greater slope than a straight line of the calculated particulate matter values. It will be appreciated that the measured test particulate matter values and the calculated particulate matter values may be non-linear over time.

According to the method, as seen in FIGS. 2-4, differences between the calculated particulate matter values and the measured particulate matter values from the test particulate matter sensor are determined over the period of time. As also seen in FIGS. 2-4, measured particulate matter values in at least one other particulate matter sensor 29 are corrected over a same period of time based on the determined differences to obtain a corrected particulate matter value.

As seen in FIG. 3, when a corrected particulate matter value differs from the calculated particulate matter value at a point over the period of time by more than a predetermined amount, a warning can be provided. In the arrangement of FIG. 1, when the controller 33 determines that the difference between the corrected particulate matter value differs from the calculated particulate matter value by greater than the predetermined amount, a signal can be sent to the indicator 41, such as a screen visible to an operator, a warning light, or an alarm.

As seen in FIG. 4, when a corrected particulate matter value differs from the calculated particulate matter value by more than a predetermined amount over a predetermined period of time Δtime, a warning can be provided. What is shown in FIG. 4 differs from what is shown in FIG. 3 in that the predetermined difference of FIG. 3 is not time-dependent, whereas the predetermined difference of FIG. 4 is time-dependent. The predetermined difference of FIG. 4 can be and ordinarily is smaller than the predetermined difference of FIG. 3.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for correcting for aging in particulate matter sensors for a diesel engine, comprising:
    calculating calculated particulate matter values for a modeled diesel engine exhaust system over a period of time;
    measuring measured test particulate matter values with a test particulate matter sensor over the period of time in a test diesel engine exhaust system;
    determining differences between the calculated particulate matter values and the measured test particulate matter values from the test particulate matter sensor over the period of time;

measuring particulate matter values with at least one other particulate matter sensor over a same period of time; and correcting the measured particulate matter values from the at least one other particulate matter sensor based on the determined differences to obtain corrected particulate matter values.

2. The method as set forth in claim 1, wherein the calculated particulate matter values are calculated using at least one of a chemical and a pressure model for soot loading.

3. The method as set forth in claim 1, wherein the calculated particulate matter values are calculated by modeling engine-out soot and filtration efficiency of a diesel particulate filter.

4. The method as set forth in claim 3, wherein the calculated particulate matter values are calculated by modeling engine-out soot and filtration efficiency of a diesel particulate filter under a plurality of diesel engine operating conditions and under a plurality of environmental conditions.

5. The method as set forth in claim 4, wherein the measured particulate matter values are measured under a plurality of diesel engine operating conditions and under a plurality of environmental conditions.

6. The a method as set forth in claim 3, wherein the test diesel engine exhaust system is operated under the same conditions as the modeled diesel engine exhaust system.

7. The method as set forth in claim 1, wherein the test diesel engine exhaust system is operated under the same conditions as the modeled diesel engine exhaust system.

8. The method as set forth in claim 1, comprising providing a warning when corrected particulate matter value differs from the calculated particulate matter value at a point over the period of time by more than a predetermined amount.

9. The method as set forth in claim 1, comprising providing a warning when a corrected particulate matter value differs from the calculated particulate matter value by more than a predetermined amount over a predetermined period of time.

10. The method as set forth claim 1, wherein the modeled diesel engine exhaust system is modeled for a diesel engine for a vehicle and the test diesel engine exhaust system is in a test vehicle.

11. A particulate matter sensor arrangement, comprising:
a particulate matter sensor configured to measure particulate matter values and produce measured particulate matter values; and
a controller programmed to provide corrected measured particulate matter values for the measured particulate matter values based on determined differences between calculated particulate matter values calculated for a modeled diesel engine exhaust system over a period of time and measured test particulate matter values measured with a test particulate matter sensor over the period of time in a test diesel engine exhaust system.

12. The particulate Matter sensor arrangement as set forth in claim 11, wherein the calculated particulate matter values are calculated using at least one of a chemical and a pressure model for soot loading.

13. The particulate matter sensor arrangement as set forth in claim 11, wherein the calculated particulate matter values are calculated by modeling engine-out soot and filtration efficiency of a diesel particulate filter.

14. The particulate matter sensor arrangement as set forth in claim 13, wherein the calculated particulate matter values are calculated by modeling engine-out soot and filtration efficiency of a diesel particulate filter under a plurality of diesel engine operating conditions and under a plurality of environmental conditions.

15. The particulate matter sensor arrangement as set forth in claim 14, Wherein the measured particulate matter values are measured under a plurality of diesel engine operating conditions and under a plurality of environmental conditions.

16. The particulate matter sensor arrangement as set forth in claim 13, wherein the test diesel engine exhaust system is operated under the same conditions as the modeled diesel engine exhaust system.

17. The particulate matter sensor arrangement as set forth in claim 11, wherein the test diesel engine exhaust system is operated under the same conditions as the modeled diesel engine exhaust system.

18. The particulate matter sensor arrangement as set forth in claim 11, comprising means for indicating when a corrected measured particulate matter value differs from the calculated particulate matter value at a point over a predetermined period of time by more than a predetermined amount.

19. The particulate matter sensor arrangement as set forth in claim 11, Wherein the modeled diesel engine exhaust system is modeled for a diesel engine for a vehicle and the test diesel engine exhaust system is in a test vehicle.

20. A vehicle, comprising:
a diesel engine;
an exhaust system downstream of the diesel, engine; and
a particulate matter sensor arrangement comprising
a particulate matter sensor configured to measure particulate matter values in the exhaust system, and
a controller programmed to provide corrected measured particulate matter values based on determined differences between calculated particulate matter values calculated for a modeled diesel engine exhaust system over a period of time and measured test particulate matter values measured with a test particulate matter sensor over the period of time in a test diesel engine exhaust system.

* * * * *